Figure 1:
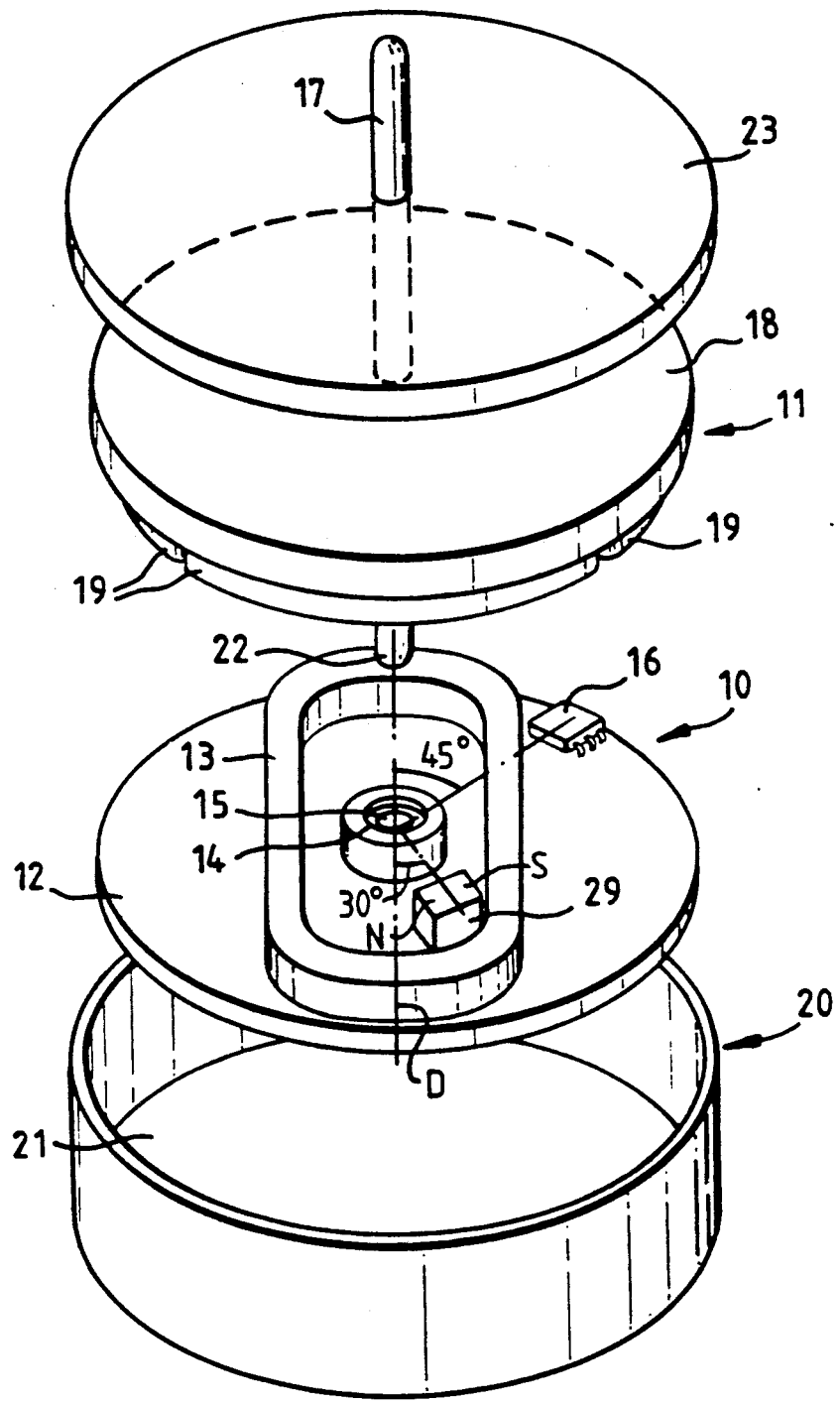

United States Patent [19]

Baines

[11] Patent Number: 5,097,170
[45] Date of Patent: Mar. 17, 1992

[54] BRUSHLESS D.C. ELECTRIC MOTOR

[75] Inventor: Roger F. Baines, Repulse Bay, Hong Kong

[73] Assignee: Johnson Electric S.A., La Chaux de Fonds, Switzerland

[21] Appl. No.: 553,365

[22] Filed: Jul. 17, 1990

Related U.S. Application Data

[63] Continuation of Ser. No. 306,493, Feb. 6, 1989, abandoned.

[30] Foreign Application Priority Data

Feb. 5, 1988 [GB] United Kingdom ............... 8802601

[51] Int. Cl.$^5$ .................. H02K 1/22; H02K 11/00; H02K 21/12
[52] U.S. Cl. ................... 310/268; 310/68 B; 310/156
[58] Field of Search .............. 310/46, 68 B, 152, 156, 310/177, 180, 184, 268, DIG. 3; 318/138, 254

[56] References Cited

U.S. PATENT DOCUMENTS

| | | | |
|---|---|---|---|
| 3,433,987 | 3/1969 | Thees | 310/156 |
| 3,644,809 | 2/1972 | Lahde | 318/138 |
| 3,946,259 | 3/1976 | McBride et al. | 310/49 R |
| 4,251,758 | 2/1981 | Pedersen et al. | 318/254 |
| 4,456,858 | 6/1984 | Loven | 318/138 |
| 4,725,752 | 2/1988 | Shiraki | 310/156 |
| 4,728,833 | 3/1988 | Shiraki et al. | 310/68 R |
| 4,733,119 | 3/1988 | Shiraki et al. | 310/268 |
| 4,804,873 | 2/1989 | Shiraki et al. | 310/67 R |
| 4,894,572 | 1/1990 | Shiraki | 310/68 B |

FOREIGN PATENT DOCUMENTS

| | | | |
|---|---|---|---|
| 0263890 | 4/1988 | European Pat. Off. | |
| 0113645 | 6/1985 | Japan | 310/156 |
| 1434192 | 5/1976 | United Kingdom | |
| 1456546 | 11/1976 | United Kingdom | |
| 1457044 | 12/1976 | United Kingdom | |

Primary Examiner—Steven L. Stephan
Assistant Examiner—C. LaBalle
Attorney, Agent, or Firm—Fleit, Jacobson, Cohn, Price, Holman & Stern

[57] ABSTRACT

The motor is for driving viscous loads, e.g. a fan, and comprises a stator (10), a permanent magnet rotor (11), a single phase unipolar winding (13) on the stator, and a permanent magnet (29) fixed relative to the stator with its poles angularly spaced with respect to the axis of the motor. The magnet (29) is positioned so that the magnetic coupling between the magnet (29) and the permanent magnet rotor will create stable rest positions for the rotor only where the winding (13) will be energized and will develop torque when power to the motor is switched on. A Hall integrated circuit (16) is provided to detect the position of the rotor relative to the stator and to alternately energize and not energize the winding (13).

2 Claims, 2 Drawing Sheets

BRUSHLESS D.C. ELECTRIC MOTOR

This application is a continuation of application Ser. No. 07/306,493, filed Feb. 6, 1989, now abandoned.

The invention relates to a brushless d.c. electric motor for driving viscous loads.

Brushless motors are often preferred because they produce less noise than commutator motors. However, electronic components in brushless motors make them more expensive.

To keep the cost of electronics low it is known to construct a motor with a single phase winding which is energised alternately in each direction by means of bipolar switches triggered by one or two sensors. It is also known to construct a motor with a two phase winding in which each winding is energised in one direction in turn. The switching is effected by two unipolar switches triggered by one or two sensors.

The present invention seeks to provide a brushless motor in which the cost of the electronic components is still further reduced.

According to the invention there is provided a brushless d.c. electric motor for driving a viscous load, comprising a stator, a permanent magnet rotor, a single phase winding on the stator, means for detecting the position of the rotor relative to the stator, means for alternately energising and not energising the single phase winding in response to the detecting means, and a permanent magnet fixed relative to the stator and arranged so that the magnetic coupling between the permanent magnet and the permanent magnet rotor results in a ripple torque having in each cycle both high and low gradient crossing points of the zero torque line, the high gradient crossing point creating an unstable rest position for the rotor where the winding will not be energised when power to the motor is switched on and the low gradient crossing point creating a stable rest position for the rotor where the winding will be energised and will develop torque when power to the motor is switched on.

With such a single phase unipolar system only one detector and one switch are required to effect electronic commutation and these may be provided by a single Hall integrated circuit.

Preferably, the poles of the permanent magnet are angularly spaced with respect to the axis of the motor.

Figure 2:
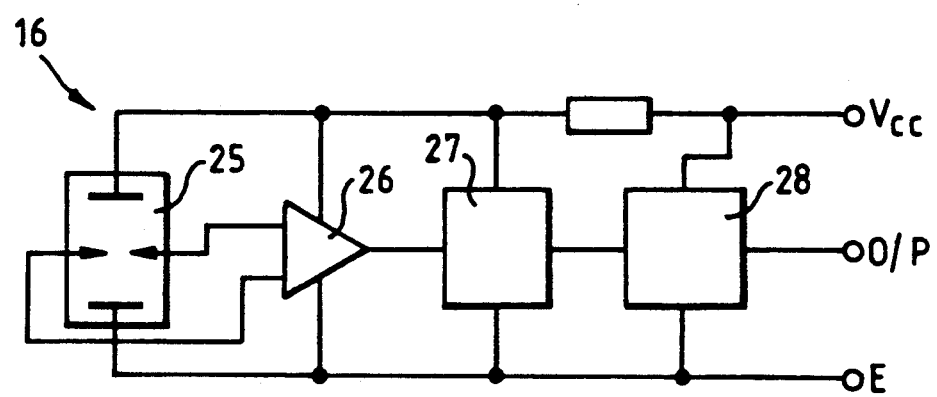
Figure 3:
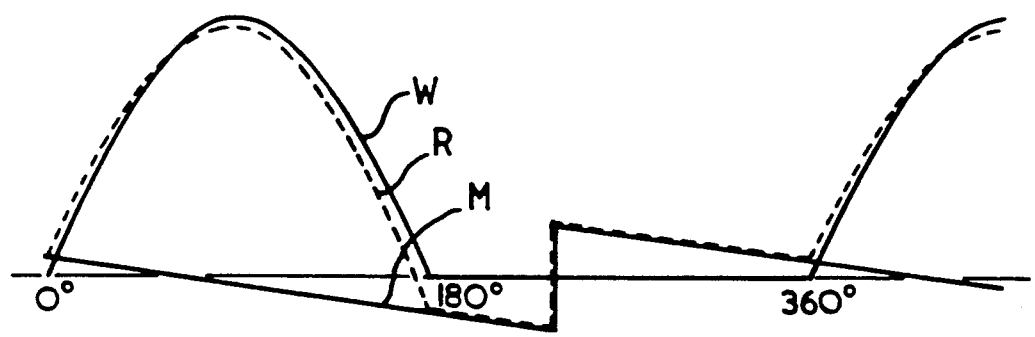

The invention will now be more particularly described, by way of example, with reference to the accompanying drawings, in which:

FIG. 1 is an exploded perspective view of one embodiment of an electric motor according to the invention, FIG. 2 is a block circuit diagram of the Hall integrated circuit of the motor, and FIG. 3 is a graph of torque plotted against angular position of the rotor.

Referring to FIG. 1 of the drawings, the brushless d.c. motor shown therein is by way of example an axial air gap motor and comprises a stator 10 and a rotor 11. The stator 10 comprises a disc-like winding support 12, typically of plastics material, and a single phase unipolar winding 13 fixed to the support 12 such as by glue. The support 12 has a central hole 14 in which a journal bearing 15 is mounted. A positional detector in the form of a Hall integrated circuit 16 is mounted on the support 12.

The rotor 11 comprises a shaft 17 mounted for rotation in the bearing 15, and a disc-like metal plate 18 supporting four segmental magnets 19. The magnets 19 are glued to the plate 18 and adjacent magnets are magnetised in opposite axial directions. Alternatively, a single annular magnet appropriately magnetised could be used.

The stator 10 and rotor 11 are mounted in a drawn shallow metal can 20 closed at one end by an integral end plate 21 which provides a thrust face for a ball end 22 of the rotor shaft 17. The can 20 is closed at its other end by a metal end cap 23.

The winding 13 extends across the stator 10 and has a plane of symmetry which contains the axis of the motor and diameter D. The Hall integrated circuit 16 is mounted in a plane which contains the axis of the motor and which is at 45° to the plane of symmetry of the winding so that it switches when two of the magnets 19 are centrally located over the winding 13.

The Hall integrated circuit 16 is typically a Panasonic DN6838 Hall I.C. Switch type and as shown in FIG. 2 comprises a Hall effect device 25, an amplifier stage 26, a Schmitt trigger 27, and an open collector output stage 28. Typically, the output stage 28 has a collector current rating of 20 mA. This is sufficient to drive the motor under viscous load e.g. when operating a small fan, and hence the winding 13 is connected to the output stage 28 avoiding the need for additional amplifiers which would add to the cost of the motor.

The winding 13 is energised by the Hall integrated circuit 16 during alternate quarter revolutions of the motor and produces torque according to curve W of FIG. 3.

It is important to ensure that the rotor does not come to rest at a zero torque position as if it did it would never start.

This is achieved by mounting a small permanent magnet 29 at a position relative to the stator winding and in an orientation such that the magnetic coupling between the magnet 29 and the permanent magnet rotor will create stable rest positions for the rotor such that when power is applied to the motor the Hall integrated circuit 16 will be located within a magnetic field from the motor which will have the particular orientation required to make the output stage 28 to be on thus allowing a current to pass into the winding 13 which will develop torque to cause the rotor to rotate. The magnet 29 is, as shown, mounted on the winding support 12 with its poles angularly spaced with respect to the axis of the motor so as to create a circumferential flux. When power is switched off the rotor 11 will turn to a position of angularly balanced magnetic stress between the magnet 29 and rotor magnets 19. Positions of angularly balanced magnetic stress occur when a pair of adjacent rotor magnets 19 are aligned with the two poles of the magnet 29, respectively. One such position is an unstable position in which like poles are aligned. The rotor 11 will not come to rest in this position; it will always come to rest in the other such position with unlike poles aligned. Consequently, by appropriate positioning of the magnet 29 with respect to the winding 13 it is possible to ensure that the rotor 11 will always cog to a position, when power is switched off, in which the winding will be energised and will develop torque when the power is next switched on.

In other words, the magnetic coupling between the magnet 29 and the rotor magnets 19 results in a ripple torque and this ripple torque has in each cycle both high gradient and low gradient crossing points of the zero torque line. The high gradient crossing point creates an unstable rest position where the winding 13 will not be energised, whilst a stable rest position is created by the low gradient crossing point where the winding 13 will be energised when power to the motor is turned on.

Ideally the ripple torque is of saw-toothed shape as shown at M in FIG. 3 and this can be determined by the geometrical shape of the rotor magnet(s), i.e. by arranging that the rotor magnet(s), as viewed in plan, define an outer edge which is slightly oval rather than circular, or by the magnetic pattern impressed into the rotor magnet(s).

The ripple torque adds up to zero in a complete cycle. It therefore neither adds to nor subtracts from the torque developed by the winding 13. However, its presence does modify the waveform of the phase torque and the resultant torque curve is shown at R in FIG. 3.

It is advantageous to arrange for the motor to come to rest at a position which will ensure that it will accelerate sufficiently to develop enough momentum to pass through the negative torque period. This can be achieved by arranging the magnet 29 such that the ripple torque crosses the zero line at the stable position with a 30 electrical degrees lead on the peak torque developed by the electric field, as shown in FIG. 3.

The value of the ripple torque can be made as low as will just ensure that a de-energised rotor will be rotated into an appropriate start position.

As shown, the magnet 29 is mounted on the winding support 12 on the inside of the winding 13. However, the magnet 29 could be mounted in any other appropriate position such as on the winding support 12 outside the winding 13 or in a cage on the outer surface of the can 20.

The above embodiment is given by way of example only and various modifications will be apparent to persons skilled in the art without departing from the scope of the invention defined by the appended claims.

I claim:

1. A single phase, unipolar, brushless direct current electric motor for driving a viscous load, comprising:
a substantially planar stator,
a permanent magnet rotor rotatable about a rotational axis and separated axially from the stator, said permanent magnet rotor comprising individual planar segmental magnets disposed side by side and lying in a plane disposed at a right angle relative to the rotational axis, said segmental magnets being magnetised in an axial direction with respect to the rotational axis, adjacent segmental magnets being magnetised in opposite axial directions,
a single phase winding on the stator having a central axis extending through the rotational axis,
means for detecting the position of the rotor relative to the stator, and alternately energising and not energising in a cycle the single phase winding in response to a detected position of the rotor relative to the stator, the winding being energised in the same direction each time, and
a small permanent magnet fixed relative to the stator and having a north pole, a south pole and a magnetic axis, said north pole and said south pole being spaced apart on said magnetic axis which extends circumferentially with respect to the stator, said magnetic axis being oriented generally at right angles relative to a radius of the stator, said radius of the stator being off-set at an angle relative to the central axis of the single phase winding so that a magnetic coupling between the small permanent magnet and the planar segmental magnets results in a ripple torque having, in each said cycle, both high and low gradient crossing points of a zero torque line, the zero torque line corresponding to positions of said rotor in which a separation between adjacent planar segmental magnets is located midway between said north pole and said south pole of the small permanent magnet, the low gradient crossing point creating a stable rest position for the rotor, and the high gradient crossing point creating an unstable position for the rotor, the small permanent magnet being positioned relative to said stator so that the stable rest position of the rotor is located so that when power to the motor is switched on and the winding is energised, torque on said rotor is developed, and so that the unstable position of the rotor located at a position in which the winding is not energised when power to the motor is switched on.

2. A motor as claimed in claim 1, wherein the permanent magnet is positioned so that the low gradient crossing point precedes a maximum rotor torque generating position.

* * * * *